United States Patent
Vrzic et al.

(10) Patent No.: US 8,538,443 B2
(45) Date of Patent: Sep. 17, 2013

(54) METHOD AND SYSTEM FOR ADJUSTING COMMUNICATION MODE BY ADJUSTING THE POWER LEVEL FOR A FRACTIONAL FREQUENCY REUSE IN A WIRELESS COMMUNICATION NETWORK

(75) Inventors: Sophie Vrzic, Nepean (CA); Jianming Wu, Kanata (CA); Mo-Han Fong, L'Original (CA)

(73) Assignee: Research In Motion Limited, Waterloo, Ontario (CA)

( * ) Notice: Subject to any disclaimer, the term of this patent is extended or adjusted under 35 U.S.C. 154(b) by 898 days.

(21) Appl. No.: 12/282,196

(22) PCT Filed: Mar. 19, 2007

(86) PCT No.: PCT/CA2007/000439
§ 371 (c)(1),
(2), (4) Date: Sep. 9, 2008

(87) PCT Pub. No.: WO2007/112547
PCT Pub. Date: Oct. 11, 2007

(65) Prior Publication Data
US 2009/0061778 A1    Mar. 5, 2009

Related U.S. Application Data

(60) Provisional application No. 60/783,982, filed on Mar. 20, 2006, provisional application No. 60/800,896, filed on May 16, 2006, provisional application No. 60/820,422, filed on Jul. 26, 2006, provisional application No. 60/823,563, filed on Aug. 25, 2006, provisional application No. 60/824,137, filed on Aug. 31, 2006, provisional application No. 60/866,303, filed on Nov. 17, 2006, provisional application No. 60/869,122, filed on Dec. 8, 2006.

(51) Int. Cl.
*H04W 72/00* (2009.01)
*H04W 74/00* (2009.01)

(52) U.S. Cl.
USPC .................... 455/447; 455/448; 455/552

(58) Field of Classification Search
USPC .......................... 455/447, 448, 552
See application file for complete search history.

(56) References Cited

U.S. PATENT DOCUMENTS

| | | | |
|---|---|---|---|
| 5,551,066 A | * | 8/1996 | Stillman et al. ................. 455/69 |
| 6,128,497 A | | 10/2000 | Faruque |
| 2006/0014542 A1 | | 1/2006 | Khandekar et al. |
| 2006/0018347 A1 | * | 1/2006 | Agrawal ........................ 370/537 |
| 2006/0223443 A1 | * | 10/2006 | Reudink ................... 455/67.11 |
| 2007/0081449 A1 | * | 4/2007 | Khan ............................ 370/208 |

FOREIGN PATENT DOCUMENTS

| | | |
|---|---|---|
| EP | 1418776 A1 | 12/2004 |
| EP | 1575233 A2 | 3/2005 |
| WO | 03105513 A2 | 12/2003 |

OTHER PUBLICATIONS

International Search Report and Written Opinion dated Jun. 28, 2007 for PCT/CA2007/000439, International Filing Date Mar. 19, 2007 (9-pages).

* cited by examiner

*Primary Examiner* — Vladimir Magloire
*Assistant Examiner* — Edd Rianne Plata
(74) *Attorney, Agent, or Firm* — Fish & Richardson P.C.

(57) ABSTRACT

A method and system for fractional frequency reuse in a communication network. A plurality of fractional frequency reuse modes for wireless communication are defined in which each of the modes are associated with a corresponding group of wireless communication tones assigned to one of a plurality of power levels. Communication with at least one mobile terminal in a first region is established using a fractional frequency reuse mode from the plurality of fractional frequency reuse modes. A coverage problem with communication with at least one of the mobile terminal in the first sector is detected. A base station associated with a second region is notified to change communication within the second region to a different fractional frequency reuse mode from the plurality of fractional frequency reuse modes.

28 Claims, 12 Drawing Sheets

METHOD AND SYSTEM FOR ADJUSTING COMMUNICATION MODE BY ADJUSTING THE POWER LEVEL FOR A FRACTIONAL FREQUENCY REUSE IN A WIRELESS COMMUNICATION NETWORK

CROSS-REFERENCE TO RELATED APPLICATIONS

This application is a Submission Under 35 U.S.C. §371 for U.S. National Stage Patent Application of International Application Number: PCT/CA2007/000439, filed Mar. 19, 2007, entitled "METHOD AND SYSTEM FOR FRACTIONAL FREQUENCY REUSE IN A WIRELESS COMMUNICATION NETWORK", which is related to and claims priority from U.S. Provisional Patent Application Nos. 60/783,982, filed Mar. 20, 2006, 60/800,896, filed May 16, 2006, 60/820,422, filed Jul. 26, 2006, 60/823,563, filed Aug. 25, 2006, 60/824,137, filed Aug. 31, 2006, 60/866,303, filed Nov. 17, 2006 and 60/869,122 filed Dec. 8, 2006, the entirety of all of which are incorporated herein by reference.

BACKGROUND OF THE INVENTION

1. Statement of the Technical Field

The present invention relates to the field of wireless communications and more particularly to a method and system for the fractional reuse of frequencies in a manner that adapts to channel environment of the wireless communication network.

2. Description of the Related Art

Wireless communication networks, such as cellular networks, operate by sharing resources among the mobile terminals operating in the communication network. As part of the sharing process, resources relating to which channels, codes, etc., are allocated by one or more controlling devices within the system. Certain types of wireless communication networks, e.g., orthogonal frequency division multiplexed ("OFDM") networks, are used to support cell-based high speed services such as those under the IEEE 802.16 standards. The IEEE 802.16 standards are often referred to as WiMAX or less commonly as WirelessMAN or the Air Interface Standard.

OFDM technology uses a channelized approach and divides a wireless communication channel into many sub-channels which can be used by multiple mobile terminals at the same time. These sub-channels and hence the mobile terminals can be subject to interference from adjacent cells because neighboring base stations can use the same frequency blocks.

As such, a method is needed to adjust the output power of the base stations to a value which enables mobile terminals at the cell edge to still communicate at an acceptable rate while not creating too much interference in neighboring cells. A method, described below, has been proposed to reduce interference caused by neighboring base stations using the same frequency blocks and thereby help to increase mobile terminal throughput and overall network capacity.

For distant mobile terminals, i.e., mobile terminals at the edge of a cell, a base station has to use more transmission power in order to reach them. Mobile terminals close to the base station require much less transmission power to receive the signal. Because known mobile terminals only transmit and receive on some but not all sub-channels of the frequency band, transmission power of sub-channels used by mobile terminals close to a base station can be lower than the transmission power of sub-channels used by mobile terminals at the cell edge. In practice, the reduced transmission power for sub-channels used by mobile terminals close to a base station creates less interference for mobile terminals close to other base stations.

It is known that a combination of high and low power sub-channels can be used to increase the overall coverage of the network compared to networks which use the same transmission power for all sub-channels. Base stations can be organized in a way to use the same set of sub-channels to serve subscribers close to them with a low transmission power. The remainder of the sub-channels are used with a higher transmission power and can be used by both distant and close subscribers. To minimize interference of high power sub-channels for clients of neighboring base stations the cells are further organized in a way that two adjacent cells do not use the same high power sub-channels. As such, cell edge mobile terminals can be scheduled on the high power tones that are not used or are used with lower transmit power by the neighbouring sectors. This approach is known as fractional frequency re-use ("FFR") as all base stations use the same frequency band with different power level restriction on different sub-channels. Some tones are used by all the sectors and thus have a reuse factor of one, whereas, other tones may only be used by a third of the sectors and thus have a reuse factor of ⅓.

Known fractional frequency reuse (FFR) schemes include hard and soft FFR schemes. Reuse, refers to the quantity of cells or sectors serviced by a base station. In such existing FFR solutions, however, the reuse factor, i.e., pattern, is fixed. In other words, the reuse arrangement of high power sub-channels and low power sub-channels within a cell can not be changed, even though the conditions within the cell have changed, either for the better or worse. Thus, there will always be some impact on throughput in known systems even when there are no coverage problems. Fixed FFR schemes, in addition, require frequency planning. In soft reuse, a portion of the tones are used with lower power, whereas, in hard reuse, a portion of the tones are not used at all.

A need exists, therefore, for improved FFR methods and systems that allow for the reuse of frequencies based on the detection of coverage problems within the cell.

SUMMARY OF THE INVENTION

In accordance with one aspect, the present invention provides a method for fractional frequency reuse in a communication network, in which a plurality of fractional frequency reuse modes for wireless communication are defined. Each of the modes is associated with a corresponding group of wireless communication tones assigned to one of a plurality of power levels. Communication is established with at least one mobile terminal in a first region using a fractional frequency reuse mode from the plurality of fractional frequency reuse modes. A coverage problem with communication with at least one of the mobile terminal in the first sector is detected. A base station associated with a second region is notified to change communication within the second region to a different mode from the plurality of fractional frequency reuse modes.

In accordance with another aspect, the present invention provides a system for fractional frequency reuse in a communication network to communicate with at least one mobile terminal in which the system includes a first and second base station each using a plurality of fractional frequency reuse modes for wireless communication. Each of the modes is associated with a corresponding group of wireless communication tones assigned to one of a plurality of power levels. The first base station has a central processing unit in which the central processing unit operates to establish communication with at least one of the mobile terminals in a first region using a fractional frequency reuse mode from the plurality of fractional frequency reuse modes, detect a coverage problem with communication with at least one of the mobile terminals in the first sector and notify the second base station associated with a second region to change communication within the second region to a different mode from the plurality of fractional frequency reuse modes.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

As an initial matter, while certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM orthogonal frequency division ("OFDM")-based systems including the 3rd Generation Partnership Project ("3GPP") and 3GPP2 evolutions. Similarly, the present invention is not limited solely to OFDM-based systems and can be implemented in accordance with other system technologies, e.g., CDMA.

Figure 1:
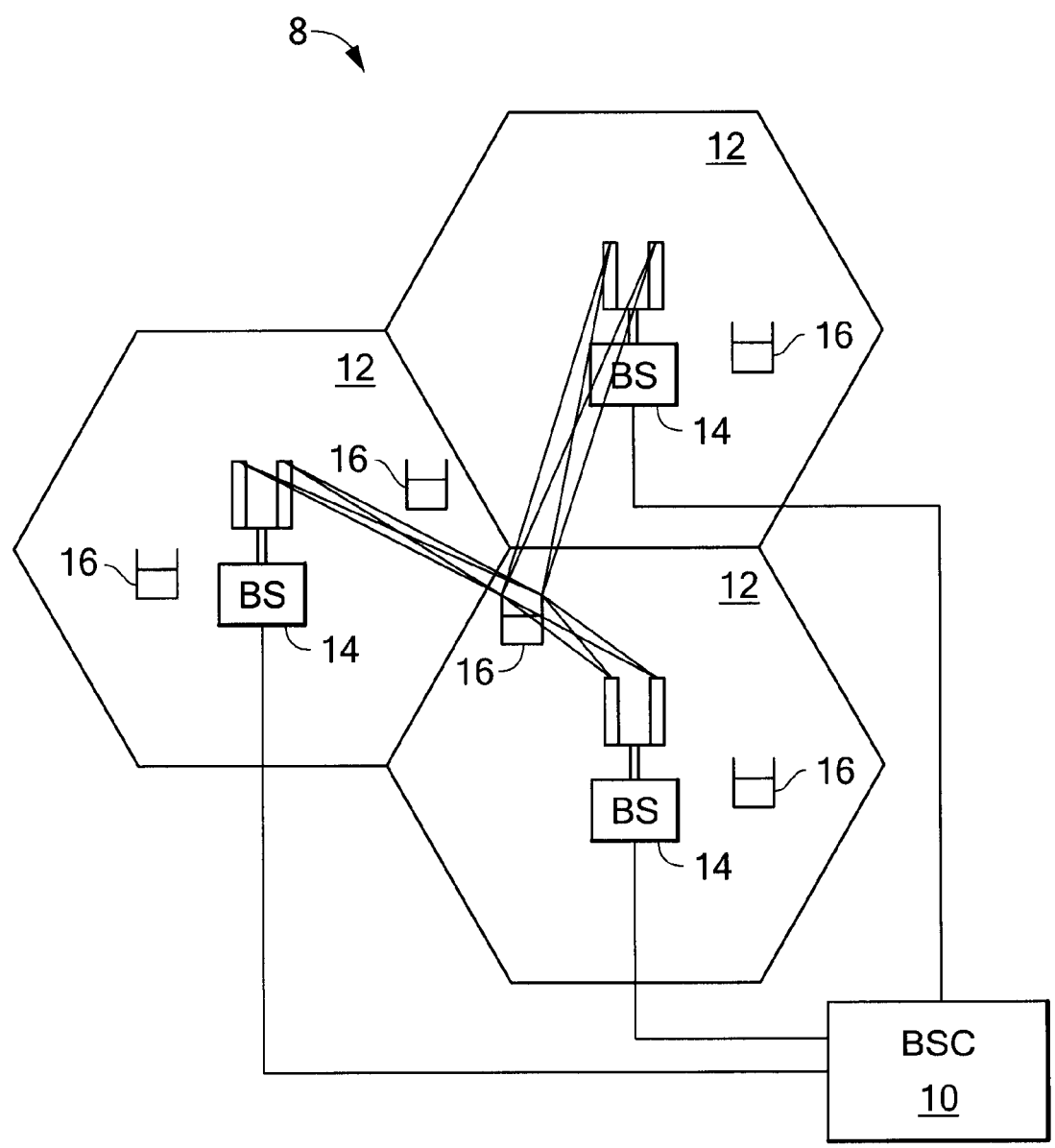
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "8." System 8 includes a base station controller ("BSC") 10 that controls wireless communications within multiple cells 12, which are served by corresponding base stations ("BS") 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
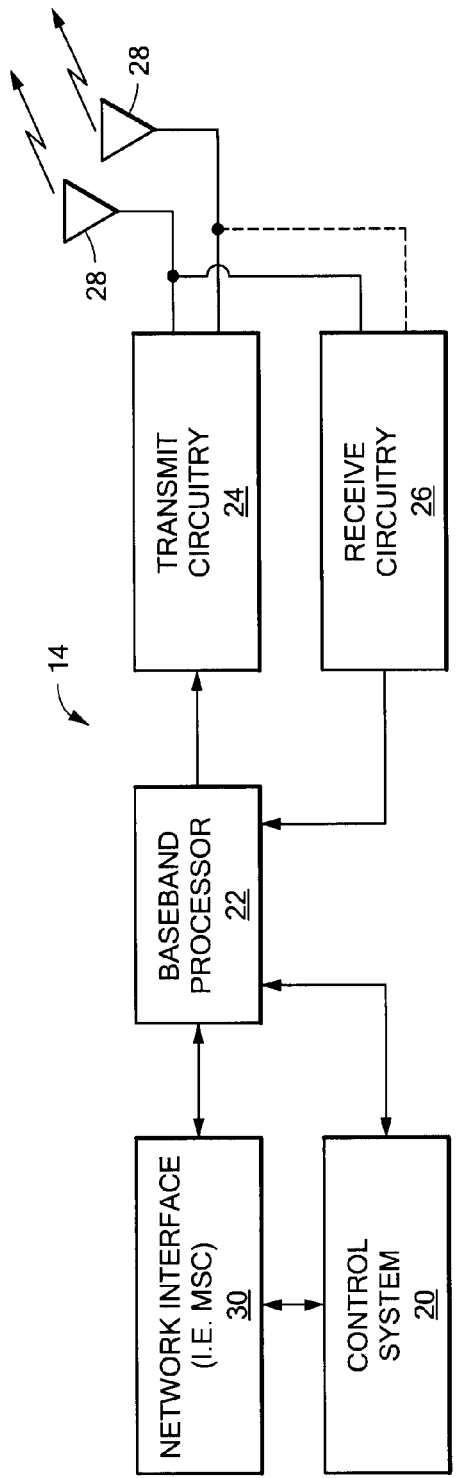
FIG. 2 is a block diagram of an exemplary base station constructed in accordance with the principles of the present invention.

A high level overview of the mobile terminals 16 and base stations 14 of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing details are described in greater detail below.

Figure 3:
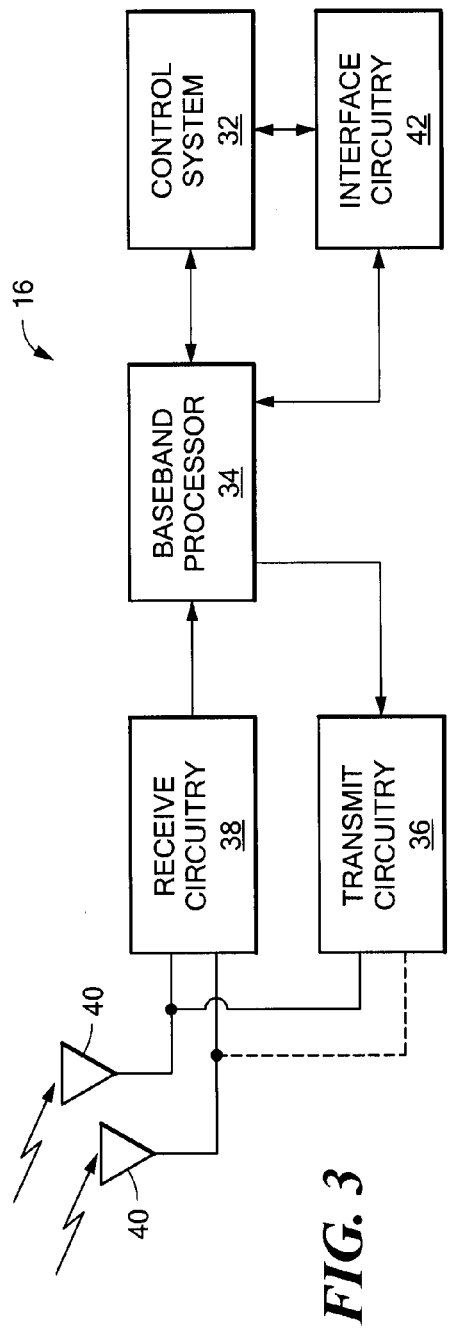
FIG. 3 is a block diagram of an exemplary mobile terminal constructed in accordance with the principles of the present invention.

With reference to FIG. 3, a mobile terminal 16 configured according to one embodiment of the present invention is described. Similar to base station 14, a mobile terminal 16 constructed in accordance with the principles of the present invention includes a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform (IDFT) and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 14 to the mobile terminals 16. Each base station 14 is equipped with n transmit antennas 28, and each mobile terminal 16 is equipped with m receive antennas 40. Notably, the respective antennas can be used for reception and transmission using appropriate duplexers or switches and are so labeled only for clarity.

Figure 4:
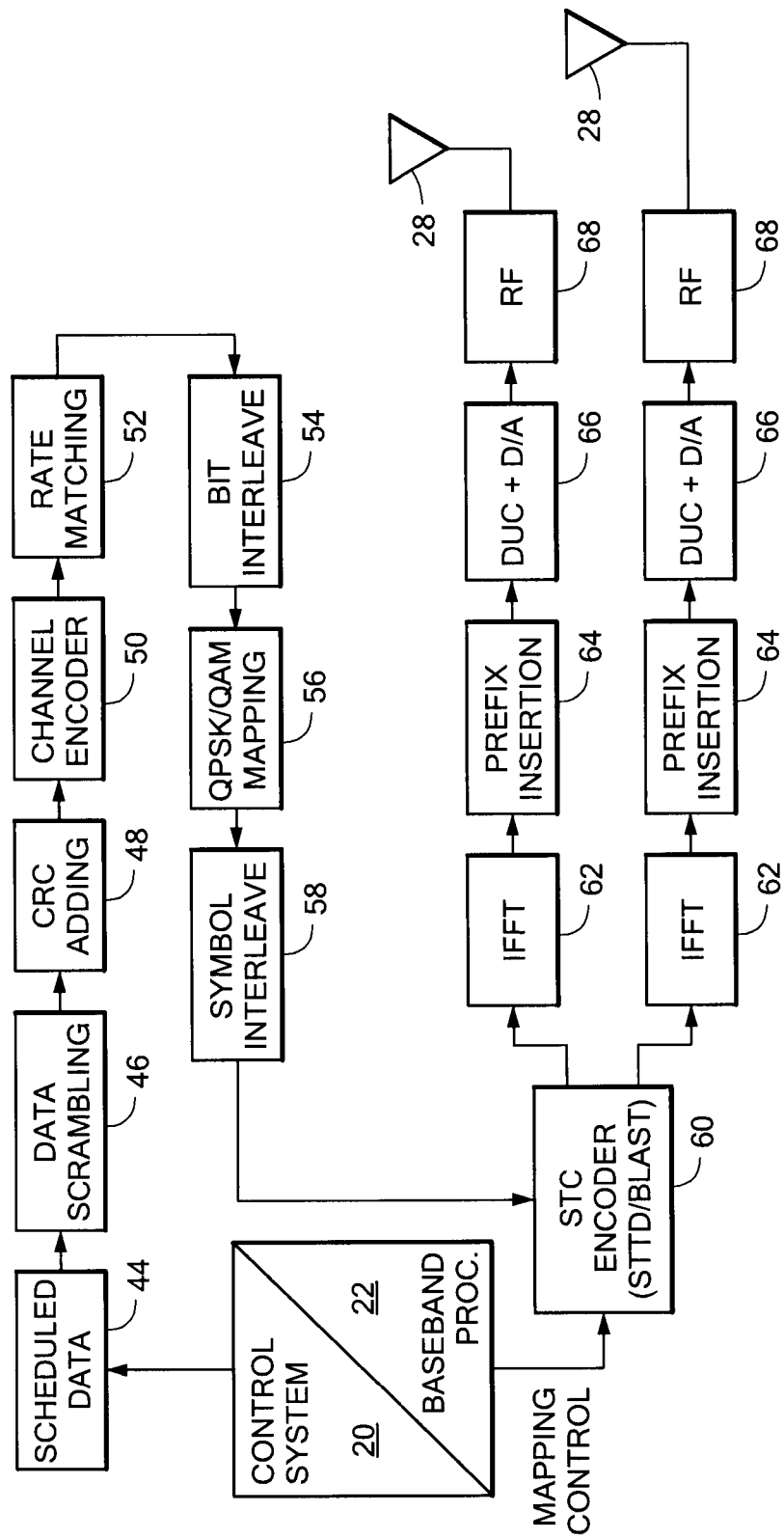
FIG. 4 is a block diagram of an exemplary OFDM architecture constructed in accordance with the principles of the present invention.

With reference to FIG. 4, a logical OFDM transmission architecture is described according to one embodiment. Initially, the base station controller 10 sends data to be transmitted to various mobile terminals 16 to the base station 14. The base station 14 may use the channel quality indicators ("CQIs") associated with the mobile terminals to schedule the data for transmission as well as select appropriate coding and modulation for transmitting the scheduled data. The CQIs may be provided directly by the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion making the transmitted signals more resistant to interference and more readily decoded at a mobile terminal 16. The STC encoder logic 60 will process the incoming symbols and provide n outputs corresponding to the number of transmit antennas 28 for the base station 14. The control system 20 and/or baseband processor 22 will provide a mapping control signal to control STC encoding. At this point, assume the symbols for the n outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
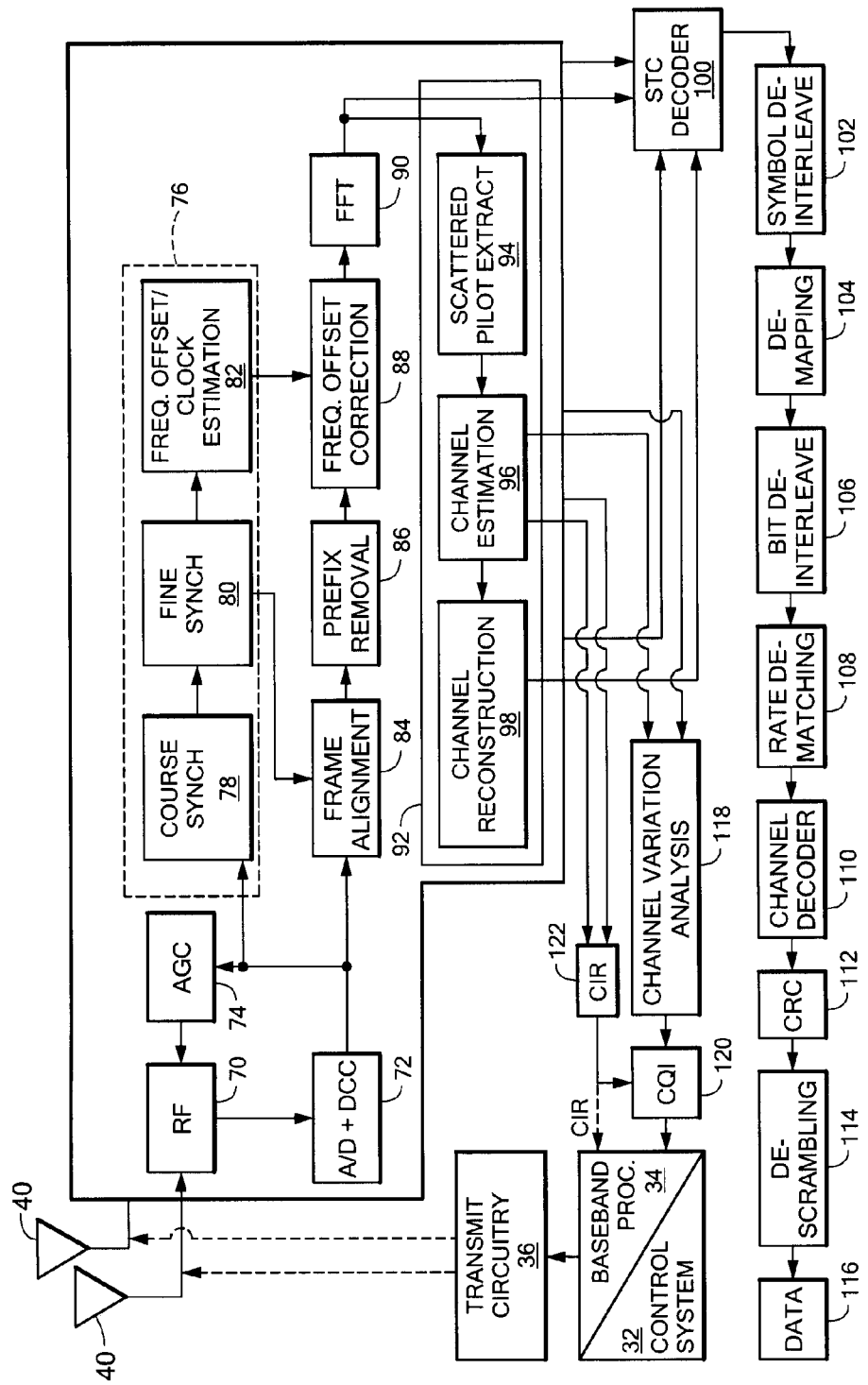
FIG. 5 is a block diagram of the flow of received signal processing in accordance with the principles of the present invention.

Reference is now made to FIG. 5 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
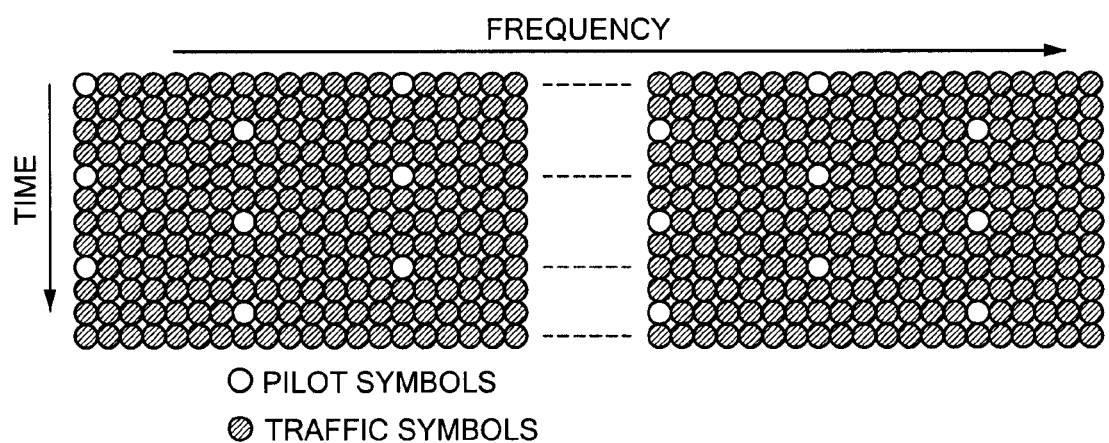
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Figure 7:
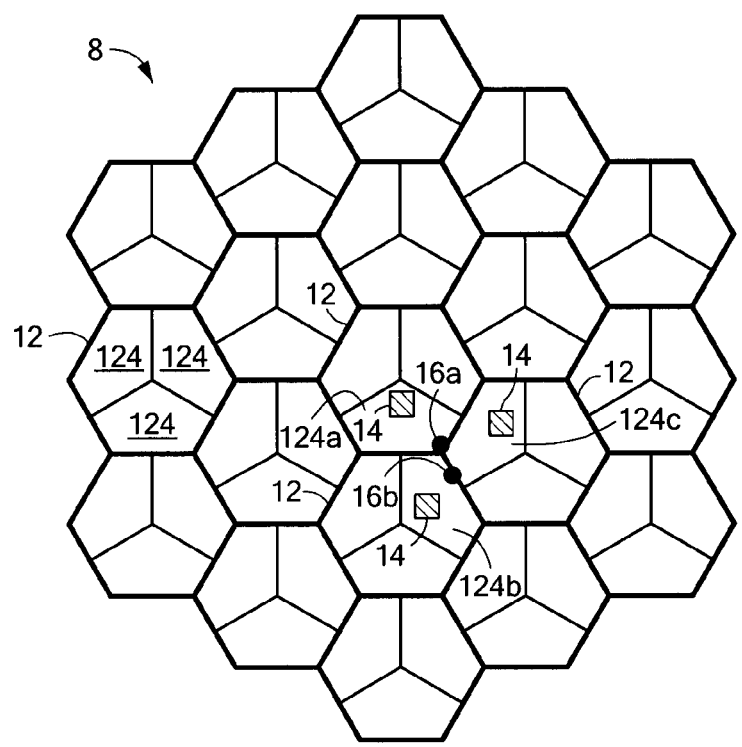
FIG. 7 is a diagram of an exemplary cell and sector architecture of the present invention.

FIG. 7 is a diagram showing an exemplary arrangement of cells 12 divided into sectors 124. Each base station 14 supports three sectors 124. Of course, cells 12 can be divided into more or fewer than three sectors. For purposes of explanation of the present invention, as is shown, mobile terminal 16a is on the edge of and is served by sector 124a and mobile terminal 16b is at the edge of and is served by sector 124b. There is no mobile terminal 16 currently near the edge of sector 124c. It is assumed that mobile terminal 16a includes sectors 124a, 124b and 124c in its active sector list and that mobile terminal 16b includes sectors 124b and 124c in its active sector list. Further the neighbor list for sector 124a includes sectors 124b and 124c, the neighbor list for sector 124b includes sector 124c and the neighbor list for sector 124c is null. Signaling for adaptive fractional frequency reuse in accordance with the present invention is described below.

The present invention defines a number of modes of operation, i.e., a number of fractional frequency reuse ("FFR") power bandwidth profiles defining the relative power between tones (symbols) across the channel frequency bandwidth. The tone power can be adjusted in an adaptive manner to minimize interference among adjacent sectors 124 and/or cells 12 (collectively referred to herein as "region") and improve performance in cell 12.

A mode is uniquely defined by the bandwidth partition into high and low power segments and by the power level of each of the high and low power segments. The mode is defined over a group of logical channel tree nodes that correspond to a set of usable frequency resources. In accordance with the present invention, if there is frequency allocation planning, the reuse patterns between interfering sectors 124 are such that the overlapping of the high power segment is minimized.

Figure 8:
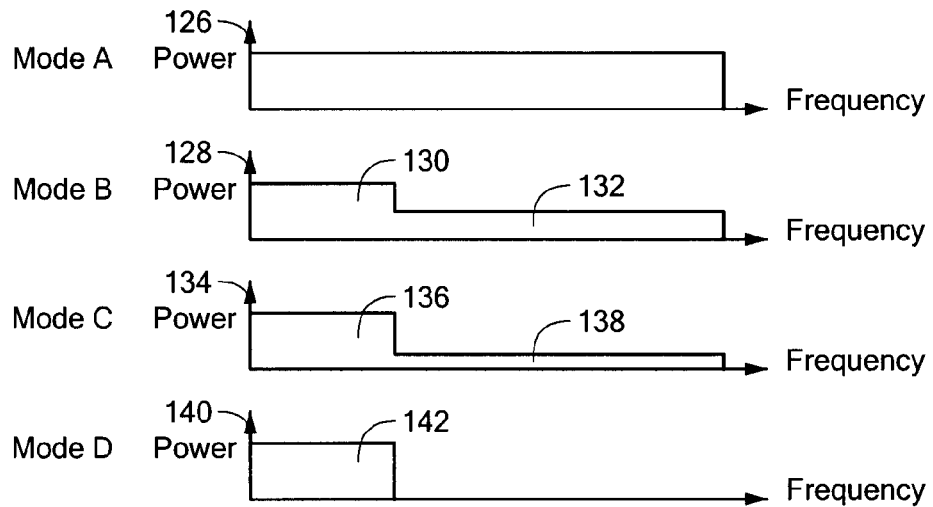
FIG. 8 is a diagram showing an exemplary fractional frequency reuse arrangement constructed in accordance with an embodiment of the invention.

Referring to FIG. 8, the present invention provides four exemplary modes of operation, it being understood that more or fewer modes can be implemented in accordance with the principles of the above mode definition. Mode A 126 has a reuse factor of 1, i.e., all tones use the same power level. Mode B 128 may be soft reuse, i.e., tones are divided into high power tones 130 and low power tones 132 in which ⅓ of the tones may be approximately full power, the other tones may use approximately half the power. Mode C 134 can be soft reuse, i.e., tones may divided into high power tones 136 and low power tones 138 in which ⅓ of the tones may be approximately full power and the other tones may be approximately ¼ the power. Mode D 140 can have a reuse factor of ⅓, i.e., use approximately full power on ⅓ of the tones 142, the other tones are not used.

In modes B 128 and C 134, the distributed resource channel ("DRCH") and block resource channel ("BRCH") channels may be assigned either high power or low power. A DRCH includes non-contiguous sub-carriers or tones that may be distributed across the entire bandwidth or a segment of the bandwidth. A BRCH includes one or more groups of sub-carriers or tones that are contiguous or generally concentrated within a group. At each scheduling instance in the case where there is no frequency planning, the scheduler may keep track of how many DRCH and BRCH are assigned full power in order to not exceed the allowed fraction of full power tones for the given FFR mode of operation.

Because the tones in each DRCH may hop and each BS may have a different hopping pattern, the interference for a mobile terminal 16 assigned a DRCH can depend on the fraction of high power tones assigned by neighboring BSs 14. For a mobile terminal 16 assigned a BRCH, the interference depends on whether or not a neighboring BS 14 has scheduled an BRCH on the same sub-band with full power.

Figure 9:
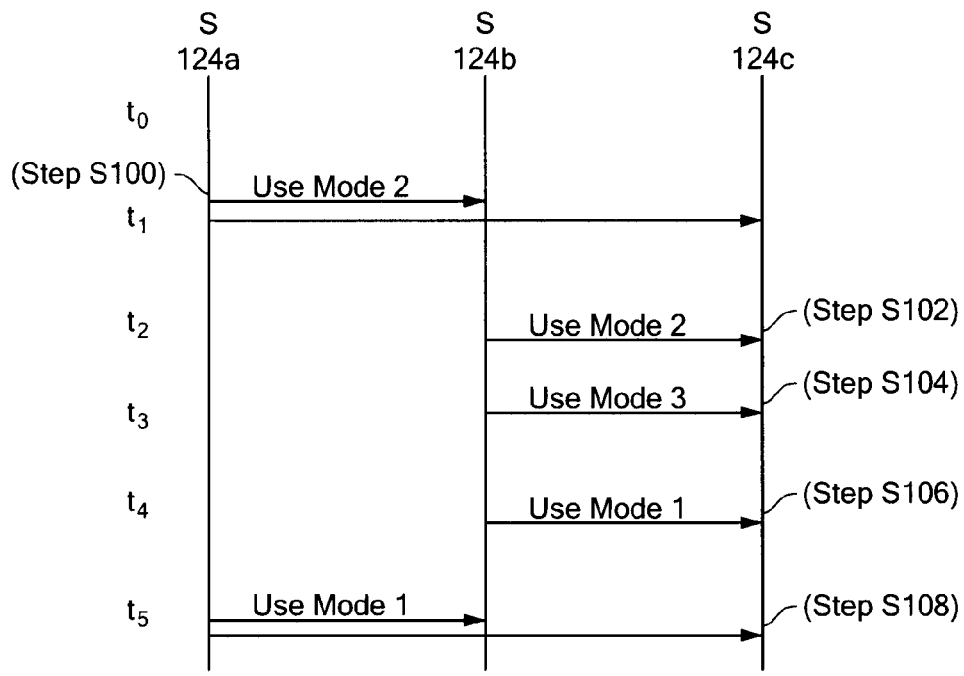
FIG. 9 is a diagram of the flow of an adaptive FFR method of the present invention without acknowledgement.

In accordance with an embodiment of the invention method for adaptive fractional frequency reuse with planning is provided. This approach is explained with reference to FIGS. 7 and 9 in which FIG. 9 is a diagram of the flow of an adaptive FFR method without acknowledgement. Initially, at t0 each BS 14 may begin in mode A 126 (also referred to herein as mode 1 or universal reuse) and keep track of coverage problems through mobile terminal 14 CQI feedback. Coverage problem as used herein refers, for example, to a situation in which the number of mobile terminals 16 at an edge of a cell 12 exceeds a certain CQI threshold.

At step S100, if BS 14 serving sector 124a detects a problem, for example the quantity of mobile terminals 16 at the cell 12 edge with data to transmit and/or receive exceeds a certain CQI threshold, the serving BS 14 may begin to use another mode. For example, the BS 14 may send a message to the members of its FFR neighbor list, e.g., BSes 14 serving sectors 124b and 124c, to use at least mode B 128 (also referred to herein as mode 2). If a neighbor is already using mode 2 or higher no further action is necessary. Each BS 14 may keep track of which BS 14 made the request and the requested mode of operation. The neighbor list can be either pre-configured or can be created dynamically by including the most dominant interferers of each of the mobile terminals 16 the sector 124 needs to serve. The most dominant interferers for a given mobile terminal 16 can be determined from the mobile terminal 16 active set.

When a BS 14 changes to a different mode within a sector 124, the BS 14 may send a broadcast message to inform the mobile terminals 16 in that sector of the new mode. BS 14 may also send an acknowledgement to the requesting BS 14 and propagate the new mode information to its list of neighbors. The current mode and associated frequency pattern are periodically broadcast to the mobile terminals 16.

As an other example, as is shown in step S102, if BS 14 serving sector 124b detects a coverage problem, e.g., re mobile terminal 16b, then BS 14 sends a request to BS 14 serving sector 124C to use mode B 128 (mode 2). If there is still a coverage problem, then BS 14 serving sector 124b sends a request to BS 14 serving sector 124c to use mode C 134 (also referred to as mode 3) in sector 124c (step S104).

If a BS in mode B 128 (mode 2) or higher for a sector detects that there is no longer a coverage problem, e.g. the CQI of a mobile terminal 16 is higher than necessary for operating in the higher mode, the BS 14 may send a message to the first tier neighbors indicating its preferred mode of operation (steps S106 and S108). It is noted that an acknowledgment mechanism can be employed so that a receiving base station 14 supporting a sector receiving a mode change request sends an acknowledgement to the sending base station 14 indicating that it will or will not change modes. For example, a receiving base station 14 may send a no acknowledgement ("NAK") if it must serve high priority users or if the sector is fully loaded.

A BS 14 may be restricted from going down to a lower level in a sector until all the mode requests from its neighbors are at that level or lower. For soft reuse modes, the low power tones may be scheduled for mobile terminals 16 at or close to the cell center. The high power tones may be scheduled for either cell edge or cell center mobile terminal 16 users. In accordance with an embodiment of the invention, the above method can advantageously be used for providing adaptive fractional frequency reuse with per cell or network wide planning.

In accordance with the present invention, each base station 14 keeps track of mode requests from the neighbors in its sector neighbor list. This neighbor list can be determined based on the senders of the mode change requests, can be a pre-configured list of neighbors or built from the active set of mobile terminals 14 determined as having a coverage problem.

Base station 14 can determine when a switch to a higher mode is needed based on: $|\{i|G_m(i)<G_{min}\}|>N_{max}$ where $G_m(i)$ corresponds to the C/I ratio based on the location of mobile terminal "i", i.e., the channel quality measurement averaged over fast fading time when mode 'm' is used. $G_{min}$ is the minimum C/I ratio based on the location of mobile terminal "i" threshold and $N_{max}$ is the maximum number of mobile terminals 16 having a C/I ratio below the minimum threshold allowed for the current mode. The "||" corresponds to the number of elements in the set.

As noted above, CQI is used to determine coverage problems within a sector. As such, the CQI for a mobile terminal 16 on each FFR sub-band is made available to its serving BS 14. The CQI for an FFR sub-band can be measured from the common pilot symbols that puncture, i.e., replace data tones in the FFR sub-band. It is contemplated that two types of reporting can be provided. Periodic CQI reports can be used to provide instantaneous channel quality indication. In the alternative, a slow CQI or CQI change can be reported for each FFR sub-band in order to capture the long term signal to noise ratio difference on each FFR sub-band.

An alternative approach to switching between different modes is to slowly adapt the maximum transmit power level threshold on the power restricted group(s) of tones. In one embodiment, the power level threshold can be adapted via down link (base station 14 to mobile terminal 16) power control by sending power level adjustments to interfering sectors in the neighbor list. Each sector receives a forward activity bit ("FAB") from its neighbors. The activity bit indicates whether or not the transmit power threshold on the restricted set of tones should be increased or decreased. For example, a FAB bit value of one indicates that the threshold should be decreased, whereas a value of zero indicates that the threshold can be increased. Since each sector receives multiple FAB bits, the "or of down" instruction is used to determine whether or not to increase or decrease the threshold. If the result of the FAB bits is to decrease the transmit power, the threshold, $P_{thresh}$ is reduced by the value $\Delta_{down}$. Otherwise, the threshold is increased by the value $\Delta_{up}$.

With the "or of down" instruction, the FAB bits from all the sectors are combined using the "or" operator. Using this instruction, a value of one indicates that the threshold should be decreased. The "or of down" instruction can return a FAB bit value of one whenever at least one of the FAB bits is one. This rule can be illustrated by the example below where sector S has three neighbors that transmit a FAB bit. The result of the "or of down" instruction for sector S is given by $$FAB=FAB_1 \cup FAB_2 \cup FAB_3$$

Where the subscript is the FAB corresponding to a sector. This non-limiting example relates to three sectors. In this embodiment, the power level threshold can be a virtual threshold that is used to determine the actual transmit power limit threshold or it can be the actual transmit power limit threshold. If the threshold is a virtual threshold, the actual threshold can be determined as follows.

If the value of the FAB bit is zero then $$P_v(t_{n+1})=P_v(t_n)+\Delta_{up}$$

$$P_{thresh}(t_{n+1})=f(P_v(t_{n+1}))$$

where the function $f(P_v(t_{n+1}))$ returns the closest threshold from a set of predetermined thresholds that is less than or equal to the given virtual threshold.
Otherwise, $$P_{thresh}(t_{n+1})=P_{thresh}(t_n)+\Delta_{down}$$

$$P_v(t_{n+1})=P_{thresh}(t_{n+1})$$

As an alternative, power control can also be controlled via up link communication (mobile terminal 16 to base station 14). The power control for the uplink can rely on either open-loop or closed-loop control, or a combination of both. In closed-loop power control, an adaptive power control target is can be used instead of a fixed power control target. An adaptive power control target is controlled either by base station 14 based on channel loading (or IoT), or by each mobile terminal 16 based on the offset between several strongest links. The former feeds back the IoT to each mobile terminal 16, while the latter does not require any feedback and it can be determined by the mobile terminal 16 according to the path-loss and shadow fading from the strongest BSs 14. The adaptive power control target for CL-PC normally is set to one value for the entire frequency band. However, it is also contemplated that the adaptive power control target can be multiple values, which are predetermined by the system 8 or configured by higher layer.

By way of example, to enable FFR on the up-link, mobile terminals 16 are grouped into two or more groups based on their power control target. For example, mobile terminals 16 with a high power control target, such as cell 12 center mobile terminals 16, are grouped together to form group $G_1$, while mobile terminals 16 with a low power control target, i.e., mobile terminals 16 at the cell 12 edge, form a separate group, $G_2$. If the frequency band is divided into three zones, one zone can be used by the sector for scheduling mobile terminals 16 from either $G_1$ or $G_2$ while the other two zones are used for scheduling group $G_1$ mobile terminals only. For a 3 sector per cell 12 layout, each sector can use a different zone for scheduling mobile terminals 16 from either $G_1$ or $G_2$. In this way, cell 12 edge mobiles will see lower interference since the interference from the other sectors will be from cell centre users, which have a lower transmit power. When cell centre users are scheduled on the unrestricted zone, they will also see less interference, which can result in a higher assigned data rate. The improvement in the channel quality due to the lower interference on the unrestricted zone can be controlled by the sector by changing the criteria used to form the group $G_1$ so that the high interferers are moved to group $G_2$ or it can be controlled by changing the target threshold for the mobiles in group $G_1$.

Figure 10:
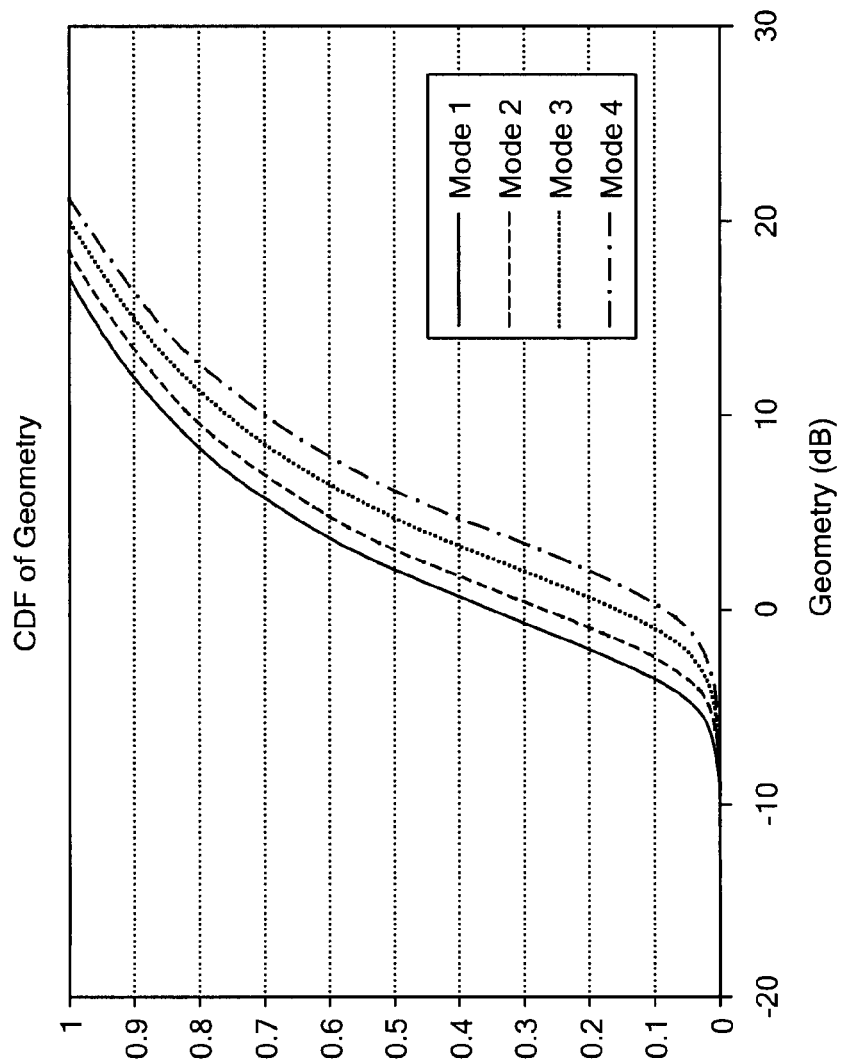
FIG. 10 is a graph showing, by mode, the probability of having a mobile terminal 16 operating at a given geometry.

In accordance with an embodiment of the invention an adaptive fractional frequency reuse method with sector planning is provided. Sector planning refers to the distribution of tones in adjacent sectors and is described in more detail below. In other words, when no planning is implemented, each sector (specifically the BS 14 controlling that sector) determines whether the predetermined frequency groups assigned to a sector are high or low power. The result is that some adjacent sectors 124 can have overlapping high power tones. As is shown in the cumulative distribution function ("CDF") graph of FIG. 10, in this embodiment, mobile terminals 16 are grouped into zones according to their geometry (which can be based on channel condition and location). FIG. 10 shows the probability of having a mobile terminal 16 operating at a given geometry. When the FFR operating mode increases to a higher level, the probability of having mobile terminals 16 with geometry less than zero dB decreases.

Of note, in accordance with an embodiment of the invention the FFR mode can be based on a threshold. For example, FFR modes could be changed on the basis of the number of users with a geometry less than a certain amount (e.g. users with G<0 dB). Alternatively, the priority of the mobile terminals 16 can be evaluated and only switch modes, for example, if a certain number of high priority users had a geometry less than 0 dB.

In accordance with an embodiment of the invention an adaptive FFR method using per cell or network-wide planning is provided. In this embodiment, the FFR method may also be used with frequency planning within a cell or network-wide planning. Each sector may have two groups of tones (e.g. high power and low power) for each mode of operation. The tones in each group can be adjacent to each other or distributed across a segment of the bandwidth or a combination of both. The high power tones may be selected so that the overlap among the sectors within a cell or across interfering sectors within the network is minimized. The frequency pattern may be obtained from the mode of operation and the sector ID, i.e., an identifier assigned to the sector. Network-wide frequency planning within a cell advantageously provides improved coverage over the case with no frequency planning. However, this arrangement also makes the channelization scheme more complex.

With per BS 14 frequency planning to allocate frequency resources among sectors or cells, channelization can use two separate resource allocation trees for the DRCH and BRCH channels, e.g. one for full power assignment, the other for low power assignment. A resource allocation tree is defined as mapping of a DRCH or BRCH to a group of tones, where a group of tones can either be high power or low power. The mapping can be hopped from one OFDM symbol to another. The hopping pattern may be different for different sectors.

Figure 11:
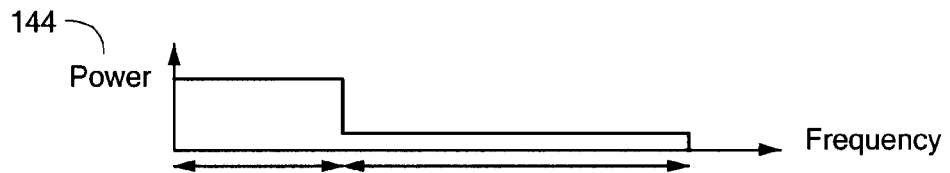
FIG. 11 is a is a chart of relative CQI values for an adaptive fractional frequency reuse method using per cell or network wide planning constructed in accordance with the principles of the present invention.
Figure 11:
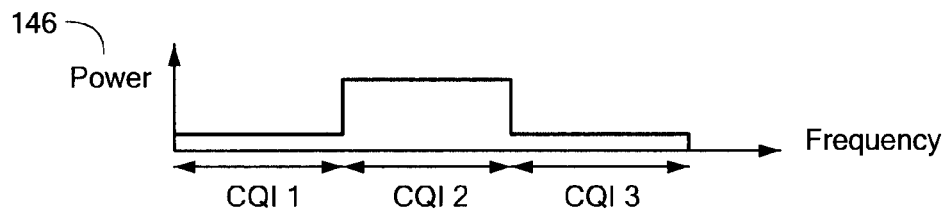

In accordance with an embodiment of the invention FIG. 11 is a chart of relative CQI values for an adaptive fractional frequency reuse method using per cell or network wide planning. Frequency vs. power graphs for serving sector 144 and interfering sector 146 are shown. As is seen, multiple CQI values may be fed back for a more accurate data rate mapping or alternatively, a CQI value can be fed back on the high power tones (or a reference FFR segment) and the difference between the high power tones (the reference FFR segment) and the low power tones (the other FFR segments) can be fed back periodically.

As one of ordinary skill in the art will appreciate, the frequencies for a particular CQI need not be continuous over a range but could hop. Additionally, overlapping frequencies could be used with a corresponding interference penalty. In contrast to the embodiments which do not use frequency planning where the overlap varies and is typically only known in statistical terms, one would know the percentage overlap in the per cell planning scenario.

The CQI on the high power tones may be determined using pilots that are primarily associated with the high power tones. The CQI on the low power tones may be determined using pilots that are primarily associated with the low power tones. According to an embodiment, the high power tones are determined only using pilots that are primarily associated with the high power tones. According to an embodiment, a pilot is associated with the high power region if it punctures a sub-carrier that belongs to a DRCH or BRCH within the high power region. This can be accomplished by using the same hopping pattern of mapping a DRCH or BRCH to physical sub-carriers in each sector. For example, each sector 124 within a cell 12 may use a different group of DRCH or BRCH (thus different physical sub-carriers) for the high power assignments. In this way, the pilots associated with the high power region will see interference from the other sectors in the cell or other interfering sectors in the network in the low power region. This can provide an accurate CQI estimation on the high power region. The CQI on the low power region may be obtained similarly using pilots primarily associated with the low power region. The CQI on the low power region may be obtained using pilots associated with the low power region only.

The hopping pattern of mapping DRCH or BRCH to physical sub-carriers or tones can be different for different sectors. The high power tones of a sector have zero or minimum overlap with the high power tones of its neighboring interfering sectors. In this way, the pilots associated with the high power region will see interference from the other sectors in the cell or other interfering sectors in the network in the low power region.

Alternatively, accurate CQI estimates may be obtained by changing the channelization so that in the diversity channel (DRCH), a group of contiguous tones of a fixed size hops rather than a single tone. In this case, the pilot that is associated with a high power region is the pilot that falls within the group of contiguous tones of a DRCH that belongs to the high power region.

Figure 12:
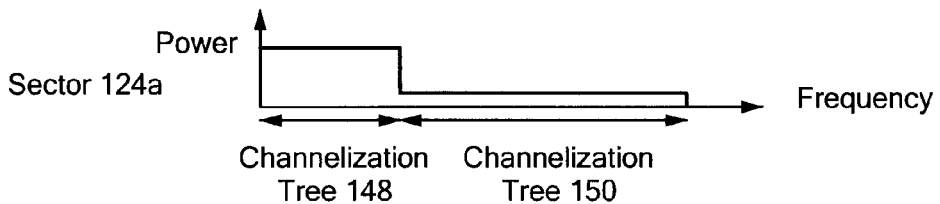
FIG. 12 is a is a diagram of an adaptive fractional frequency reuse method using DRCH per cell planning.
Figure 12:
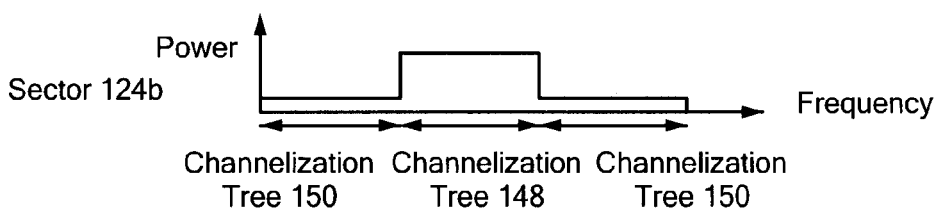
Figure 12:
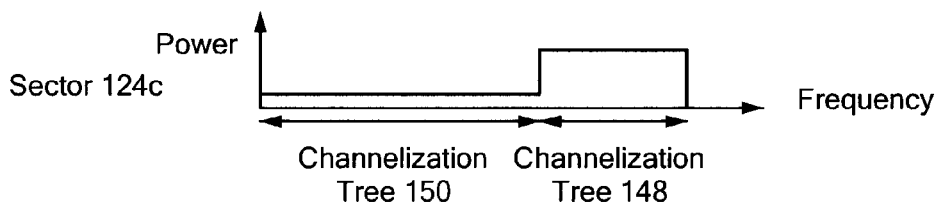

FIG. 12 is a diagram of an adaptive fractional frequency reuse method using per cell planning, specifically DRCH, at for example, for mode C 134 (mode 3). In this arrangement, different channelization trees can be used for high power and low power mobile terminals 16 so that there is no overlap in high power tones across sectors for a given channelization tree, e.g., channelization tree 148.

Figure 13:
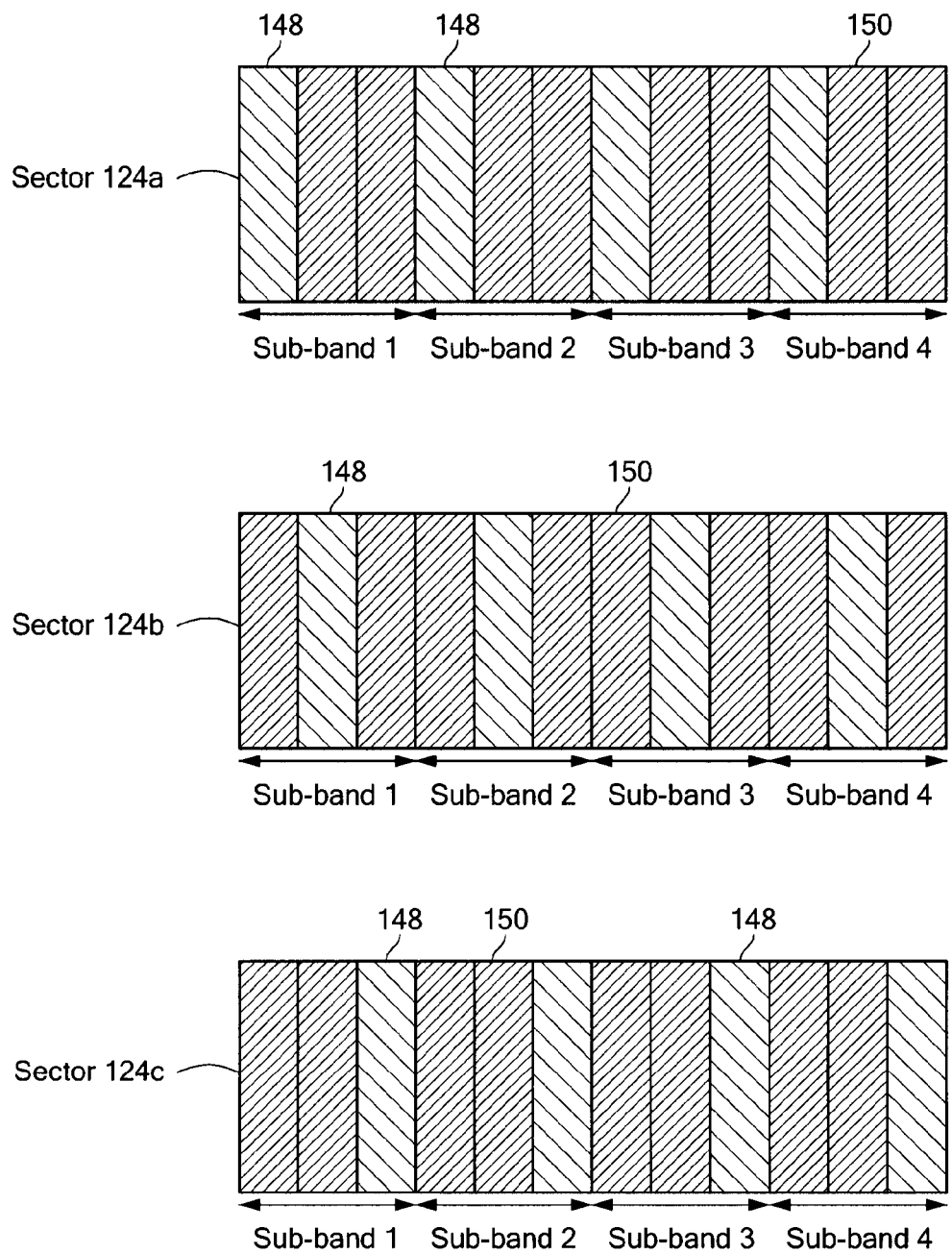
FIG. 13 is a diagram of an exemplary adaptive fractional frequency reuse method using BRCH per cell planning.

FIG. 13 is a diagram of an exemplary adaptive fractional frequency reuse method using per cell planning, specifically BRCH, at for example mode C134 (mode 3). May use different channelization trees for high power and low power users so that there is no overlap in high power tones across sectors for a given channelization tree, e.g., channelization tree 148 assuming channelization tree 148 uses high power tones and channelization tree 150 uses low power tones.

Alternatively, DRCH may use a single channelization tree rather than separate trees for the high and low power tones. In this case, the mapping to sub-carriers may be the same for each sector for all modes except mode 1. Different sectors in a cell may then use different DRCH channels for high power tones.

In the case where both DRCH and BRCH coexist in the same physical layer frame, two channelization techniques may be used. If the DRCH and the BRCH channels are defined or mapped to separate sub-bands (where a sub-band is a segment of bandwidth that consists of contiguous sub-carriers) then high power groups may be defined for DRCH and BRCH separately. Alternatively, if the BRCH and DRCH are both used over an overlapping band, for example, over the entire band, and DRCH punctures the BRCH channels, then both channels may use the same high power group of tones. In this case, the high power group must contain enough contiguous tones so that an BRCH channel can be defined within the high power group. The high power group should also consist of multiple sets of contiguous tones that are spread over the entire bandwidth in order to provide enough diversity when a DRCH channel is assigned using either the high power tones or the low power tones.

When a BS 14 switches to a new mode, it may broadcast to the mobiles the mode, any new hopping pattern, the hybrid automatic repeat request ("HARQ") interlace the FFR mode is applied to and any additional information the mobiles need to decode the data, such as any power level restriction on low power tones. The new FFR mode can be applied to a single HARQ interlace or multiple HARQ interlaces. A different FFR mode can also be specified for each HARQ interlace.

Of note, FFR does have an impact on mobile terminal 16 geometry when frequency planning is used. When the FFR operating mode increases to a higher level, the probability of having mobile terminals 16 with geometry less than zero decreases. By comparison with arrangements that do not use frequency planning, the degradation in the case where frequency planning is not used for modes B 128 and C 134 (modes 2 and 3) is less than 0.3 dB and 0.5 dB, respectively, as compared with arrangements that use frequency planning. However, for mode D 140 (also referred to as mode 4), the degradation is approximately 1.5 dB higher. Thus frequency planning can improve the CDF of geometry.

The adaptive frequency reuse method of the present invention advantageously does not impact throughput when there are no coverage problems. Also, the impact on throughput is minimized because only the coverage gain information is obtained. Further, the method of the present invention does not require any frequency planning and only minimal additional feedback from mobile terminals 16 is necessary. In accordance with an embodiment of the invention, the above scheme can be used for providing adaptive fractional frequency reuse with per cell or network wide planning.

In accordance with the present invention, when a BRCH arrangement is used and the number of FFR sub-bands is greater than the number of frequency selective sub-bands, multiple sub-bands can be assigned to the same mobile terminal 16.

Figure 14:
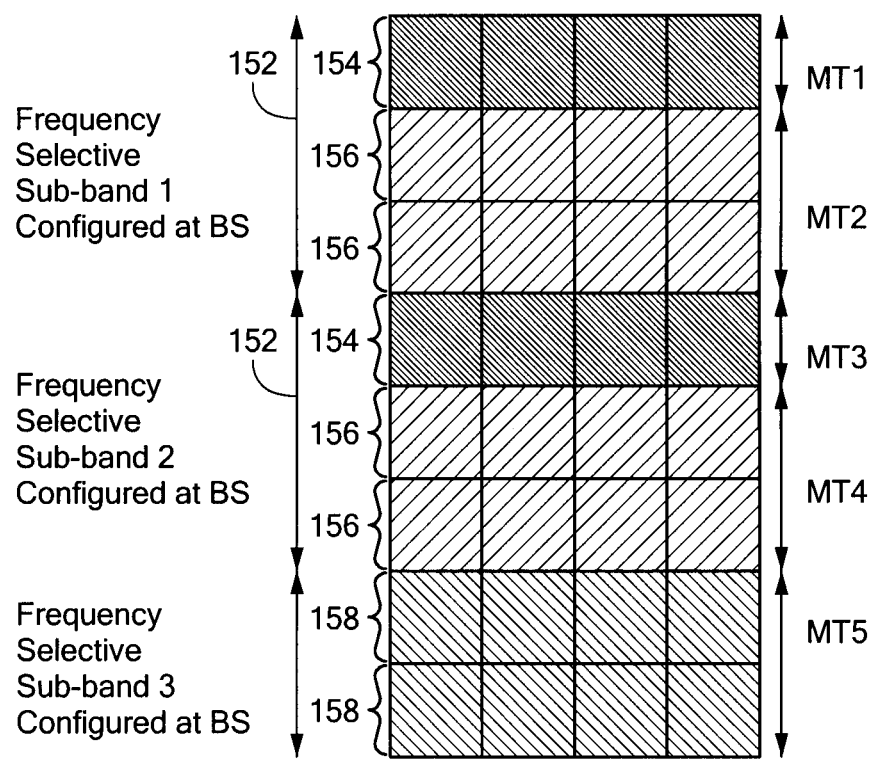
FIG. 14 a diagram of a mobile terminal sub-band assignment arrangement using a BRCH arrangement in which the number of FFR sub-bands is greater than the number of frequency selective sub-bands.

For example, as shown in FIG. 14, if there are 3 FFR sub-bands 152 in a frequency selective sub-band with one higher power FFR sub-band 154 and two lower power FFR sub-bands 156, a different cell edge mobile terminal ("MT") 16 may be assigned to each high power FFR sub-band 154, but the two lower power FFR sub-bands 156 in each frequency selective sub-band may be assigned to the same AT.

Figure 15:
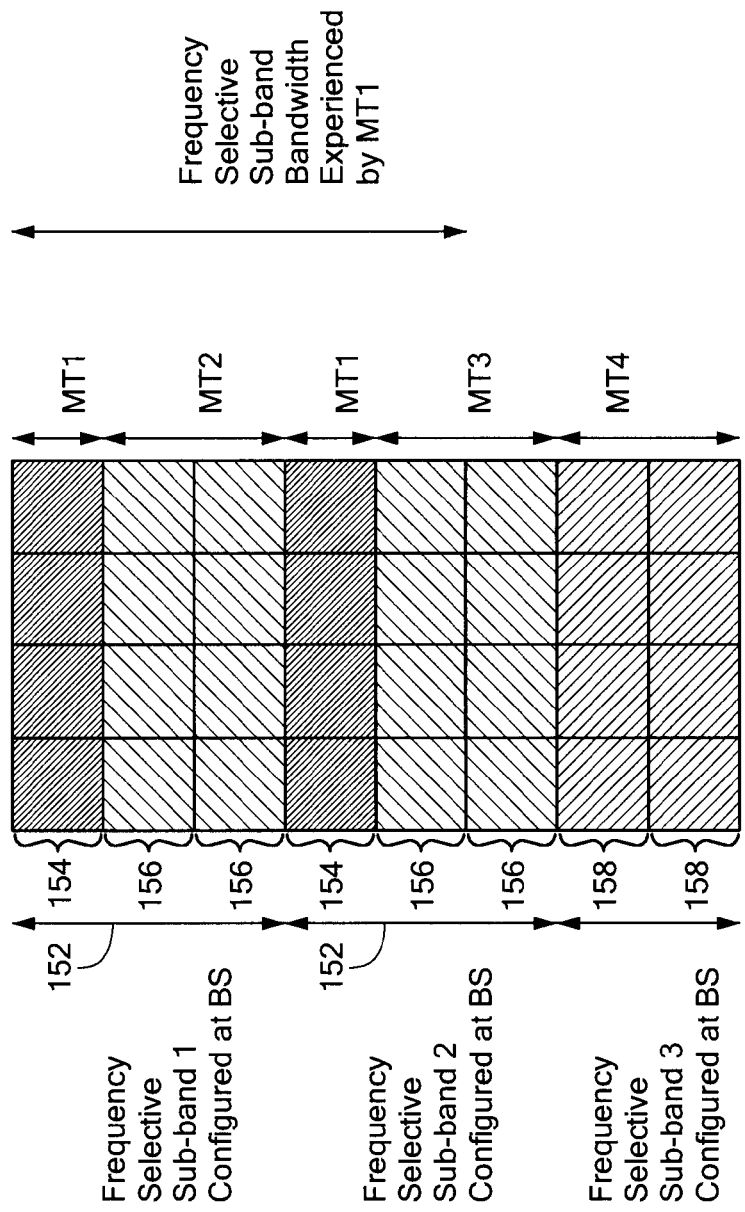
FIG. 15 a diagram of an another mobile terminal sub-band assignment arrangement using a BRCH arrangement in which the number of FFR sub-bands is greater than the number of frequency selective sub-bands.

Alternatively, as shown in FIG. 15, a single cell edge MT 16 may be assigned multiple higher power FFR sub-bands 154 corresponding to different frequency selective sub-bands. This may be used when the frequency selective bandwidth experienced by a MT 16 spans across more than one frequency selective sub-band configured at the BS 14.

One of ordinary skill in the art will recognize that the number of FFR sub-bands and arrangement of high power to lower power bands per frequency selective sub-band is merely for purposes of illustration and is not intended to limit the broader invention described and claimed herein.

In accordance with another embodiment of the invention, in order to assign multiple sub-bands to the same MT 16 with a single forward link assignment message ("FLAM") an additional block type may be introduced to the forward link shared control channel ("F-SCCH"). The additional block type, FLAM-BRCH, may be used with or without FFR and may include a sub-band bitmap to identify which sub-bands are allocated to a mobile terminal 16. The length of the bitmap may be the same as the number of sub-bands or the number of FFR sub-bands when FFR is enabled, but the subject invention is not limited in this regard.

In accordance with the present invention, when FFR is enabled, a hopping region for a F-SCCH may be defined. The F-SCCH hopping region may be a subset of the defined FFR sub-bands. For example, the higher power FFR sub-bands may be used to form the F-SCCH hopping region. The high power FFR sub-bands may be spread out across the band to give more diversity to the F-SCCH. For the case of a DRCH, F-SCCH hopping region may be defined within the higher power DRCH FFR sub-band. For the case of BRCH, the F-SCCH hopping region may span across multiple higher power BRCH FFR sub-bands which are spread out across the band.

Figures 16, 17:
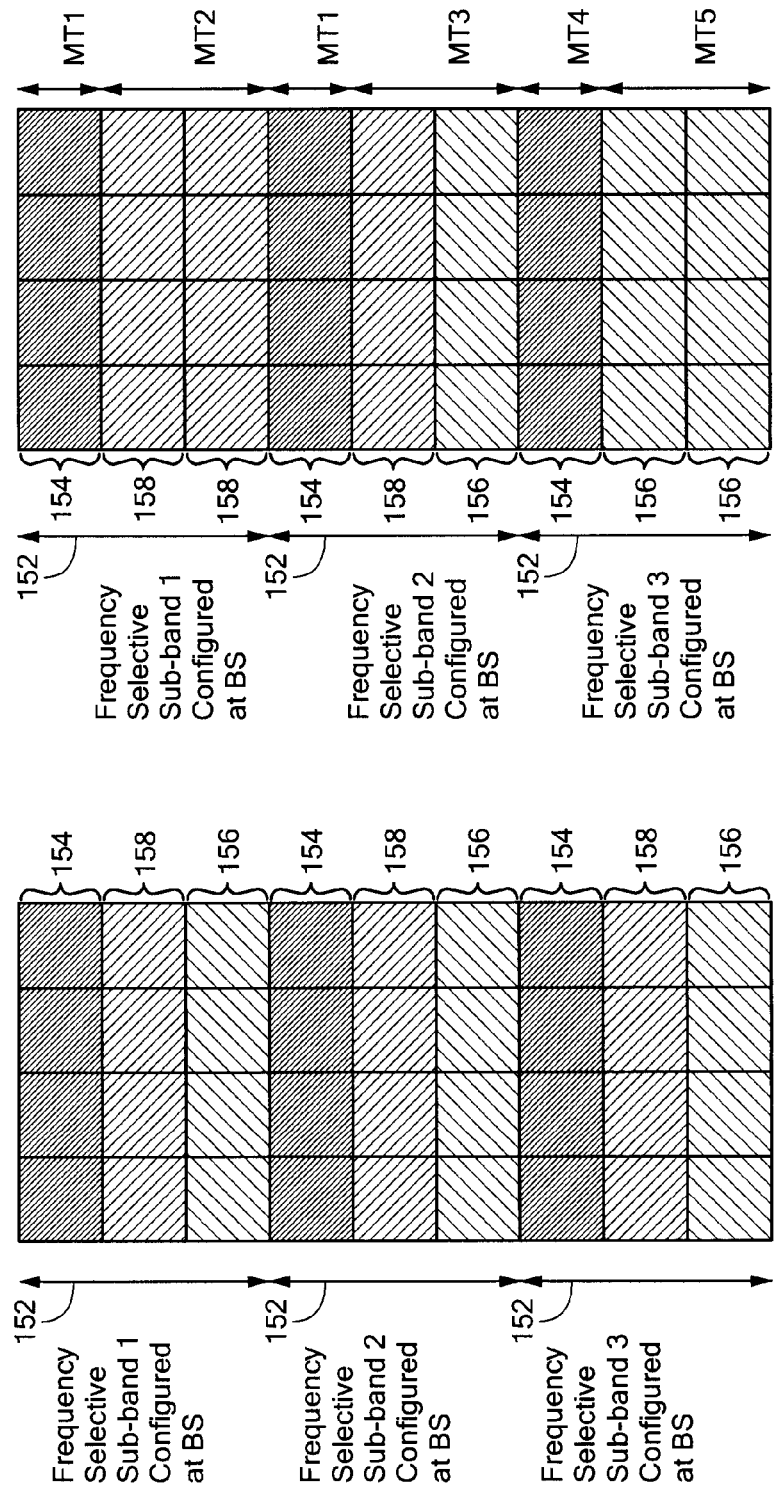
FIG. 16 is a diagram of showing a mode allocation arrangement in which a full mode is defined within each frequency selective sub-band.
FIG. 17 is a diagram of showing a mode allocation arrangement in which a partial mode is defined within each frequency selective sub-band.

In order for the MTs 16 to determine where the F-SCCH is located, the higher power FFR sub-bands may be signaled to the MTs 16 using a bitmap. One bit may be signaled to indicate whether or not the high power segments are cyclically rotated. For the case of BRCH, remaining FFR sub-bands, i.e., those that are not used for F-SCCH, may be configured as follows:

As is shown in FIG. 16, a full mode may be defined within each frequency selective sub-band 152, e.g., frequency selective sub-bands 1-3 include a high power FFR sub-band 154, a low power FFR sub-band 156 and a medium power FFR sub-band 158; or As is shown in FIG. 17, a partial mode may be defined within each frequency selective sub-band such that not all power levels need be supported in each frequency selective sub-band 152.

For the case of BRCH, the remaining FFR sub-bands, i.e., those that are not used for F-SCCH, may be cyclically shifted from frame to frame or from interlace to interlace.

Alternatively, a F-SCCH hopping region may be a reserved set of physical tones that spread over the entire bandwidth (using a BRCH or DRCH). In this case, the reserved set of tones need not be the same size or structure as the FFR sub-band. The set of tones may be distributed or may be in the basic unit of a BRCH tile. FFR sub-bands may be defined on the remaining physical tones and the reserved set of physical tones may hop from symbol to symbol or from frame to frame.

The reserved set of physical tones may be located such that they do not collide with high power FFR sub-bands of interfering sectors 124. One way to achieve this is be to use the same set of physical tones at the interfering sectors for cell center or lower power transmissions. In order for the mobile terminals 16 to determine where an F-SCCH is located, a reserved set of tones may be signaled to the mobile terminals 16 on the broadcast signaling, e.g. secondary broadcast channel ("F-SBCCH"). One possible signaling format is the F-SBCCH may indicate the size of the F-SCCH hopping region. The actual physical tones may be determined from the F-SCCH hopping region size using a predefined mapping and hopping pattern.

In accordance with the present invention, if a mode includes a higher power segment that is cyclically rotated from frame to frame then the F-SCCH hopping region can be defined as the high power FFR sub-band. The location of the high power sub-band may be signaled to the mobile terminals 16 using a bitmap. The bitmap may indicate which sub-band is the high power sub-band on a reference interlace. One additional bit may be signaled to indicate that the higher power FFR sub-band is cyclically shifted. The F-SCCH hopping region may be specified on the system broadcast signaling channel, for example, the Forward Secondary Broadcast Channel ("F-SBCCH"). This specification can include a bitmap of interlaces associated with a hopping region, the number of sub-bands for a hopping region in which the sub-bands may be assumed to be evenly distributed across the band, an offset of a first sub-band of a hopping region on a reference interlace and a flag to indicate whether or not the hopping region is cycling over the specified interlaces.

In accordance with the present invention, the number of sub-bands for DRCH and BRCH may be signaled separately. Further, for DRCH, the number of FFR sub-bands may only be signaled when FFR is enabled for DRCH. Also, for BRCH, the number of sub-bands may be equal to the number of FFR sub-bands when FFR is enabled. Otherwise, it may be equal to the number of frequency selective sub-bands. It is also noted that the number of sub-bands may be sent on the system broadcast signaling channel, e.g., the Forward Secondary Broadcast Channel (F-SBCCH).

In the case of a multiplexing mode where non overlapping DRCH and BRCH sub-bands are defined, the following may be defined in the F-SBCCH or another system broadcast signaling channel including, the total number of sub-bands, a bitmap to indicate which sub-band(s) are for DRCH and which sub-band(s) are for BRCH and a flag to indicate if FFR is enabled for DRCH. If FFR is enabled for DRCH, the number of DRCH FFR sub-bands is signaled. Note that there is no need to indicate the number of BRCH FFR sub-bands since it is the same as the BRCH sub-bands indicated in the above-mentioned bitmap.

In the case of a multiplexing mode where DRCH punctures into BRCH, the following may defined in the F-SBCCH or another system broadcast signaling channel including, the number of DRCHs allocated, the total number of BRCH sub-bands in which, when FFR is enabled for BRCH, the number of BRCH sub-bands may be equal to the number BRCH FFR sub-bands and a flag to indicate if FFR is enabled for DRCH. If FFR is enabled for DRCH, the number of DRCH FFR sub-band may be signaled.

In accordance with the present invention, when the mode is broadcast to the mobile terminals 16, the power level of some or all of the FFR sub-bands may be signaled as well as the number of sub-bands and the hopping pattern. The power level information may be used by the mobile terminals 16 when the mode is defined for BRCH by cycling the higher power segment across the different FFR sub-bands. The mobile terminals 16 may use the power level information in reporting a best band. In this way, the cell edge mobile terminals 16 may avoid selecting a lower power segment as a best band.

Regarding BRCH assignment with FFR, it is noted that, a block type is defined to allow the assignment of multiple sub-bands to the same mobile terminal 16 with a shared FLAM. This block type is used on the F-SCCH and is referred to herein as the FLAM-SB. The FLAM-SB can be used with or without FFR and identifies sub-bands that are allocated to the mobile terminal 16. In accordance with one arrangement, the new message can indicate which sub-zones are assigned by specifying the sub-zone set the assigned sub-zones belong to, the offset of the first sub-zone assigned from the specified sub-zone set and the quantity of sub-zones assigned. It is also contemplated that this information can be specified using a bit map.

It is noted that, while, much of the above discussion relates to dynamic FFR in the downlink direction, it is understood that the methods, systems and embodiments described are equally applicable to uplink communications.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method for fractional frequency reuse in a communication network, the method comprising:
defining a plurality of fractional frequency reuse modes for wireless communication, each of the modes being associated with a corresponding group of wireless communication tones assigned to one of a plurality of power levels;
establishing communication with at least one mobile terminal in a first sector using a fractional frequency reuse mode from the plurality of fractional frequency reuse modes;
detecting a coverage problem with communication with at least one of the mobile terminals in the first sector, detecting a coverage problem including determining that a quantity of data for communication with a mobile terminal approximately at a cell edge of the first sector exceeds a predetermined threshold; and
notifying a base station associated with a second sector to change communication within the second sector to a different mode from the plurality of fractional frequency reuse modes so that a power level of a first group of wireless communication tones decreases from a first power level to a second power level and so that a power level of a second group of wireless communication tones remains the same.

2. The method of claim 1, wherein detecting a coverage problem includes determining that a quantity of mobile terminals at a cell edge corresponding to the first sector with data to communicate exceeds a predetermined CQI threshold.

3. The method of claim 1, wherein the plurality of modes includes a mode having a soft reuse factor.

4. The method of claim 3, wherein ⅔ of the group of wireless tones are low power tones and the other ⅓ of the group of wireless tones are high power tones, the high power tones being transmitted substantially at a full power level and the low power tones are transmitted substantially at one half full power.

5. The method of claim 3, wherein two thirds of the group of wireless tones are low power tones and the other third of the group of wireless tones are high power tones, the high power tones being transmitted substantially at a full power level and the low power tones are transmitted substantially at one quarter full power.

6. The method of claim 1 wherein the plurality of modes includes a mode having a reuse factor of ⅓ in which substantially full power is used on ⅓ of the tones and the remaining ⅔ tones are not used.

7. The method of claim 1, further comprising receiving one of an acknowledgement and a no acknowledgement from the base station associated with the second sector that the communication mode in the second sector has been changed.

8. The method of claim 1, further comprising using frequency planning to allocate frequency resources.

9. The method of claim 1, further comprising assigning at least one frequency reuse sub-band to the at least one mobile terminal, the assigned at least one frequency reuse sub-band corresponding to the mode assigned by the base station.

10. The method of claim 9, wherein the assigned at least one frequency reuse sub-band includes tones at a first power level, the first power level being less than a second power level from the plurality of power levels.

11. The method of claim 9, wherein the at least one sub-band includes a channel hopping region.

12. The method of claim 11, wherein the channel hopping region includes one or more distributed resource channels (DRCHs).

13. The method of claim 11, wherein the channel hopping region includes one or more block resource channels (BRCHs).

14. The method of claim 1, wherein the plurality of power levels includes a first power level and a second power level lower than the first power level, wherein changing to the different mode includes adapting the maximum transmit power level threshold on the tones assigned to the second power level.

15. A system for fractional frequency reuse in a communication network to communicate with at least one mobile terminal, the system comprising:
- a first and second base station each using a plurality of fractional frequency reuse modes for wireless communication, each of the modes being associated with a corresponding group of wireless communication tones assigned to one of a plurality of power levels, the first base station having a central processing unit, the central processing unit operating to:
- establish communication with at least one of the mobile terminals in a first sector using a fractional frequency reuse mode from the plurality of fractional frequency reuse modes;
- detect a coverage problem with communication with at least one of the mobile terminals in the first sector, detecting a coverage problem including determining that a quantity of data for communication with a mobile terminal approximately at a cell edge of the first sector exceeds a predetermined threshold; and
- notify the second base station associated with a second sector to change communication within the second sector to a different mode from the plurality of fractional frequency reuse modes so that a power level of a first group of wireless communication tones decreases from a first power level to a second power level and so that a power level of a second group of wireless communication tones remains the same.

16. The system of claim 15, wherein detecting a coverage problem includes determining that a quantity of mobile terminals at a cell edge corresponding to the first sector with data to communicate exceeds a predetermined CQI threshold.

17. The system of claim 15, wherein the plurality of modes includes a mode having a soft reuse factor.

18. The system of claim 17 wherein $2/3$ of the group of wireless tones are low power tones and the other $1/3$ of the group of wireless tones are high power tones, the high power tones being transmitted substantially at a full power level and the low power tones are transmitted substantially at one half full power.

19. The system of claim 17, wherein two thirds of the group of wireless tones are low power tones and the other third of the group of wireless tones are high power tones, the high power tones being transmitted substantially at a full power level and the low power tones are transmitted substantially at one quarter full power.

20. The system of claim 15 wherein the plurality of modes includes a mode having a reuse factor of $1/3$ in which substantially full power is used on $1/3$ of the tones and the remaining $2/3$ tones are not used.

21. The system of claim 15, wherein the central processor further operates to receive one of an acknowledgement and a no acknowledgement from the second base station that the communication mode in the second region has been changed.

22. The system of claim 15, wherein frequency planning is used to allocate frequency resources.

23. The system of claim 15, wherein the central processing unit further operates to assign at least one frequency reuse sub-band to the at least one mobile terminal, the assigned at least one frequency reuse sub-band corresponding to the mode assigned by the base station.

24. The system of claim 23, wherein the assigned at least one frequency reuse sub-band includes tones at a first power level, the first power level being less than a second power level from the plurality of power levels.

25. The system of claim 23, wherein the at least one sub-band includes a channel hopping region.

26. The system of claim 25, wherein the channel hopping region includes one or more distributed resource channels (DRCHs).

27. The system of claim 25, wherein the channel hopping region includes one or more block resource channels (BRCHs).

28. The system of claim 15, wherein the plurality of power levels includes a first power level and a second power level lower than the first power level, wherein changing to the different mode includes adapting the maximum transmit power level threshold on the tones assigned to the second power level.

* * * * *